(12) United States Patent
Sakamoto

(10) Patent No.: US 7,263,969 B2
(45) Date of Patent: Sep. 4, 2007

(54) IDLE AIR CONTROL APPARATUS IN MULTIPLE THROTTLE BODY

(75) Inventor: Hitoshi Sakamoto, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/546,246

(22) Filed: Oct. 12, 2006

(65) Prior Publication Data

US 2007/0079803 A1   Apr. 12, 2007

(30) Foreign Application Priority Data

Oct. 12, 2005   (JP) .............................. 2005-297964

(51) Int. Cl.
*F02D 9/08*   (2006.01)
*F02M 69/32*   (2006.01)

(52) U.S. Cl. .................. 123/336; 123/339.23
(58) Field of Classification Search ........... 123/339.23, 123/336, 337, 442
See application file for complete search history.

(56) References Cited

U.S. PATENT DOCUMENTS 6,334,430 B1 * 1/2002 Itabashi ...................... 123/336
6,415,765 B1 * 7/2002 Akagi et al. ................ 123/336
6,446,599 B1 * 9/2002 Nakayasu .............. 123/339.23
6,585,547 B2 * 7/2003 Tsubouchi et al. ........ 440/88 A
6,868,828 B2 * 3/2005 Kondo ................... 123/339.26
2007/0068487 A1 * 3/2007 Sakamoto .................... 123/336

FOREIGN PATENT DOCUMENTS

JP    2004-211612    7/2004

* cited by examiner

*Primary Examiner*—Hai Huynh
(74) *Attorney, Agent, or Firm*—Bacon & Thomas, PLLC

(57) ABSTRACT

To make easier designing of an idle control apparatus for a multiple throttle body inexpensively, first and second air control holes (5, 6) are open to an upper side wall (2a) of a valve body slidable hole (2) of a control apparatus main body (1) in an idle air control apparatus (S) between one side wall (17) of a first throttle body (T1) and another side wall surface (26) of a second throttle body (T2), first and second air holes (9, 10) are open to a lower side wall (2b), first and second bypass air passages (18, 27) communicate with the first and second air control hole (5, 6) via the one and other side wall surfaces (17, 26) respectively, and first and second air introduction path (19, 28) communicate with the first and second air holes (9, 10) via the one and other sidewall surfaces (17, 26) respectively.

4 Claims, 6 Drawing Sheets

A ←——→ B

IDLE AIR CONTROL APPARATUS IN MULTIPLE THROTTLE BODY

BACKGROUND OF THE INVENTION

1. Field of the Invention

The present invention relates to an idle air control apparatus supplying an idle air to an intake passage at a downstream side of a throttle valve via a bypass air passage, and more particularly to an idle air control apparatus in a multiple throttle body supplying a bypass air controlled by a single plunger valve to an intake passage at a downstream side of each of throttle valves of a plurality of adjacent throttle bodies via respective bypass air passages.

2. Description of the Conventional Art

In FIG. 3 of Japanese Unexamined Patent Publication No. 2004-211612, there is shown a first example of an idle air control apparatus provided with a plurality of intake passages, and supplying a bypass air controlled by a single plunger valve to an intake passage at a downstream side of each of the intake passages via a plurality of bypass air passages.

In this case, a description will be given by using names and reference symbols used in the publication.

An upstream side first idle air distribution path 10A extending along a longitudinal direction of a throttle valve shaft 3, and an upstream side second idle air distribution path 11A extending along the longitudinal direction of the throttle valve shaft 3 are open to a side wall 7B of a slidable valve guide tube 7 integrally formed with a throttle body 1, a downstream side first idle air distribution path 10B extending along a longitudinal direction of a first intake passage 2A is branched from the upstream side first idle air distribution path 10A, and the downstream side first idle air distribution path 10B is open to the first intake passage 2A at a downstream side of a throttle valve 4. Further, a downstream side second idle air distribution path 11B extending along a longitudinal direction of a second intake passage 2B is branched from the upstream side second idle air distribution path 11A, and the downstream side second idle air distribution path 11B is open to the second intake passage 2B at a downstream side of the throttle valve 4. In this case, an idle air introduction path 9 is open to a bottom portion 7A of the slidable valve guide tube 7.

Accordingly, a valve body 14 arranged within the slidable valve guide tube 7 controls the openings of the upstream side first idle air distribution path 10A and the upstream side second idle air distribution path 11A open to the slidable valve guide tube 7, whereby an idle air is controlled, and the idle air is supplied to the second intake passage 2B at the downstream side of the throttle valve 4 from the downstream side second idle air distribution path 11B as well as being supplied to the first intake passage 2A at the downstream side of the throttle valve 4 from the downstream side first idle air distribution path 10B.

Further, a second example of the idle air control apparatus is shown in FIG. 6 of the publication mentioned above.

In accordance with this example, a slidable valve guide tube 55B is provided within a control case 55 formed independently from the throttle body, an idle air introduction path 56 is open to a bottom portion 55C of the slidable valve guide tube 55B, and a first idle air distribution path 57 and a second idle air distribution path 58 are open to a side wall 55D of the slidable valve guide tube 55B.

Further, a downstream side of the first idle air distribution path 57 is coupled to a first intake passage 51B via a first distribution path 61, and a downstream side of the second idle air distribution path 58 is connected to the second intake passage 51A via a second distribution path 62.

Accordingly, a valve body 60 arranged within the slidable valve guide tube 55B controls the openings of the first idle air distribution path 57 and the second idle air distribution path 58 open to the slidable valve guide tube 55B, whereby the idle air is controlled, and the idle air is supplied to the first intake passage 51B via the first distribution path 61, and is supplied to the second intake passage 51A via the second distribution path 62.

SUMMARY OF THE INVENTION

Problem to be Solved by the Invention

In accordance with the first example of the conventional idle air control apparatus mentioned above, all the air passages of the upstream side first and second idle air distribution paths and the downstream side first and second idle air distribution paths are provided in the throttle body, whereby freedom of designing the passage within the throttle body is low, and it takes a long time to design the passage.

Further, it is hard to shorten a passage length of each of the passages so that a working length is elongated, and a test step of testing a leakage from a blow hole is necessary at a time of working the air passage in the throttle body.

Further, plugs closing the openings of the distribution paths are necessary in end portions of the upstream side first and second idle air distribution paths.

Further, in accordance with the second example of the conventional idle air control apparatus, the first distribution path and the second distribution path are formed by a pipe material such as a rubber pipe or the like, and it is necessary to connect one ends thereof to a joint of the control case, and connect the other ends to a joint of the throttle body. In accordance with this structure, it takes a lot of man-hours to execute a connecting work of the pipe, and pipes are arranged so as to be exposed to the outside of the throttle body. Particularly, in a two-wheeled vehicle in which the throttle body is arranged so as to be exposed to the ambient air and an accommodating space is limited narrow, an outer appearance is deteriorated and it is hard to arrange the pipe.

The idle air control apparatus in the multiple throttle body in accordance with the present invention is made by taking the problems mentioned above into consideration, and an object of the present invention is to provide the apparatus mentioned above in which all the air passages constituting the idle air control apparatus can be easily designed, the passages can be inexpensively formed, and the apparatus has an excellent maintenance characteristic.

Means for Solving the Problem

In order to achieve the object mentioned above, in accordance with a first aspect of the present invention, there is provided an idle air control apparatus in a multiple throttle body comprising:

a first throttle body provided with a first intake passage so as to pass through an inner portion thereof, and structured such that the first intake passage is opened and closed by a first throttle valve;

a second throttle body provided with a second intake passage so as to pass through an inner portion thereof, and structured such that the second intake passage is opened and closed by a second throttle valve;

the first throttle body and the second throttle body being arranged in adjacent to each other; and idle air controlled by a single plunger valve actuated by a valve body driving mechanism being supplied to a downstream side intake passage from a first throttle valve via a first bypass air passage and supplied to a downstream side intake passage from a second throttle valve via a second bypass air passage, wherein the idle air control apparatus is provided with a first air control hole and a second air control hole which are open to an upper side wall of a valve body slidable hole provided in a control apparatus main body, and is provided with a first air hole and a second air hole which are open to a lower side wall, and the first air control hole and the second air control hole are arranged movably within the valve body slidable hole, and are controlled so as to be opened and closed by the plunger valve actuated by the valve body driving mechanism, wherein the idle air control apparatus is fixedly arranged so as to be held between one side wall surface forming a facing surface to the first throttle body, and another side wall surface forming a facing surface to the second throttle body, the one side wall surface and the other side wall surface being adjacent to each other, the first bypass air passage communicating with the intake passage at the downstream side of the first throttle valve is connected with the first air control hole via the one side wall surface of the first throttle body, and the second bypass air passage communicating with the intake passage at the downstream side of the second throttle valve is connected with the second air control hole via the other side wall surface of the second throttle body, and wherein a first air introduction path communicating with the intake passage at the upstream side of the first throttle valve is connected with the first air hole via the one side wall surface of the first throttle body, and a second air introduction path communicating with the intake passage at the upstream side of the second throttle valve is connected with the second air hole via the other side wall surface of the second throttle body.

Further, in accordance with a second aspect of the present invention, in addition to the first aspect mentioned above, another side mounting wall surface and one side mounting wall surface are formed in the control apparatus main body, the other side mounting wall surface being arranged at another side of the valve body slidable hole and formed in a flat shape, and the one side mounting wall surface being arranged at one side of the valve body slidable hole and formed in a flat shape, the first air control hole is open to a first communication groove provided in a concave manner in the other side mounting wall surface, and the first air hole is arranged so as to be open to the other side mounting wall surface, the second air control hole is open to a second communication groove provided in a concave manner in the one side mounting wall surface, and the second air hole is arranged so as to be open to the one side mounting wall surface, the first air introduction path open to the one side wall surface of the first throttle body is connected with the first air hole open to the other side mounting wall surface, and the first bypass air passage is connected with the first air control hole via the first communication groove open to the other side mounting wall surface, and the second air introduction path open to the other side wall surface of the second throttle body is connected with the second air hole open to the one side mounting wall surface, and the second bypass air passage is connected with the second air control hole via the second communication groove open to the one side mounting wall surface.

Further, in accordance with a third aspect of the present invention, in addition to the second aspect mentioned above, a first seal member and a second seal member are arranged in the other side mounting wall surface of the control apparatus main body and the one side mounting wall surface thereof, respectively, the first seal member shutting off communication between the opening of the first communication groove including the first air control hole and the opening of the first air hole, and the second seal member shutting off communication between the opening of the second communication groove including the second air control hole and the opening of the second air hole.

Further, in accordance with a fourth aspect of the present invention, in addition to the second aspect mentioned above, groove widths of the first communication groove and the second communication groove are made larger than hole diameters of the first air control hole and the second air control hole, and hole diameters of the first bypass air passage and the second bypass air passage.

Effect of the Invention

In accordance with the first aspect of the present invention, the valve body slidable hole, in which the plunger valve is arranged movably, is provided in the control apparatus main body, the first air control hole and the second air control hole are open to the upper side wall of the valve body slidable hole, and the first air hole and the second air hole are provided so as to be open to the lower side wall thereof.

The control apparatus main body mentioned above is fixed so as to be held between the one side wall surface of the first throttle body and the other side wall surface of the second throttle body which are adjacently provided, and under such a state, the first bypass air passage provided in the first throttle body is connected with the first air control hole of the control apparatus main body via the one side wall surface of the first throttle body, and the second bypass air passage provided in the second throttle body is connected with the second air control hole of the control apparatus main body via the other side wall surface of the second throttle body.

Further, the first air introduction path provided in the first throttle body is connected with the first air hole of the control apparatus main body via the one side wall surface of the first throttle body, and the second air introduction path provided in the second throttle body is connected with the second air hole of the control apparatus main body via the other side wall surface of the second throttle body.

In accordance with the structure mentioned above, since the first air control hole, the second air control hole, the first air hole and the second air hole, which are open to the inside of the valve body slidable hole, are provided in the control apparatus main body, the first air introduction path and the first bypass air passage are provided in the first throttle body, and the second air introduction path and the second bypass air passage are provided in the second throttle body, it is possible to shorten the passage lengths of all the air paths constituting the idle air control apparatus, whereby it is possible to largely improve the freedom of designing the air passages and it is possible to extremely inexpensively form the air passages (in accordance with a machine work or a casting work).

Further, in accordance with the structure that the idle air control apparatus is fixedly arranged so as to be held between the one side wall surface of the first throttle body and the other side wall surface of the second throttle body which are adjacently provided, it is possible to effectively use a space portion between the facing surfaces of the adjacent throttle bodies, and it is possible to arrange the multiple throttle body including the idle air control apparatus in a compact manner.

Further, in accordance with the structure mentioned above, since all the air passages constituting the idle air control apparatus are formed in the inner portion of the throttle body and the control apparatus main body, and pipe connections are not necessary at all, it is possible to arrange an outer appearance neatly, and a preferable effect can be obtained in a structure in which the accommodating space is limited, and the throttle body is directly exposed to the ambient air, particularly such as the two-wheeled vehicle.

Further, the control apparatus main body can be detached from the one side wall surface and the other side wall surface of the adjacently provided throttle bodies. In accordance with this structure, it is possible to largely improve a maintenance characteristic of the plunger valve, the first and second air control holes and the first and second air holes in the control apparatus main body, and the first and second bypass air passages and the first and second air introduction paths in the first and second throttle bodies.

Further, the present control apparatus main body can be employed commonly for many kinds of multiple throttle bodies, for example, having different equipments. In accordance with this structure, it is possible to increase a production number of the control apparatus main body, and it is possible to reduce a manufacturing cost.

Further, in accordance with the second aspect of the present invention, the first air hole and the first communication groove are arranged so as to be open to the other side mounting wall surface of the control apparatus main body, and the first air control hole is open to the first communication groove. Further, the second air hole and the second communication groove are arranged so as to be open to the one side mounting wall surface of the control apparatus main body, and the second air control hole is open to the second communication groove. Further, the first air introduction path and the first bypass air passage are open to the one side wall surface of the first throttle body. Further, the second air introduction path and the second bypass air passage are open to the other side wall surface of the second throttle body. Accordingly, it is possible to form the passage of all the air passages short in length, whereby it is possible to easily design the air passages, and it is possible to shorten the passage working time.

Further, since both ends of the first and second air introduction paths, the first and second bypass air passages, the first and second air holes, and the first and second air control holes are open at a time of detaching the control apparatus main body from the first and second throttle bodies, it is particularly possible to well maintain the passages and holes.

Further, since both ends of all the passages are open, and it is not necessary to close one end of the passage by a ball plug or the like, it is possible to easily form the passages.

Further, all the passages can be formed with short lengths and in a linear shape. Accordingly, it is possible to extremely easily execute the passage design and the passage work, and it is particularly possible to cast the linear passages at a time of injection molding the throttle body and the control apparatus main body.

Further, since it is possible to commonly use the control apparatus main body by making the opening positions of the bypass air passage and the air introduction path provided in the throttle body to the respective wall surfaces constant, when the idle air control apparatus mentioned above is used for the different throttle bodies, it is possible to provide the idle air control apparatus having a high general-purpose property.

Further, in accordance with the third aspect of the present invention, the opening of the first communication groove including the first air control hole, and the opening of the first air hole are shut off by the first seal member arranged on the other side mounting wall surface, and the opening of the second communication groove including the second air control hole, and the opening of the second air hole are shut off by the second seal member arranged on the one side mounting wall surface. In accordance with this structure, since the air in the first air hole does not flow into the first communication groove, and the air in the first air control hole does not leak into the first air hole via the first communication groove, it is possible to securely supply the idle air controlled by the first air control hole to the first bypass air passage. Similarly, it is possible to securely supply the idle air controlled by the second air control hole to the second bypass air passage.

Further, in accordance with the fourth aspect of the present invention, the first air control hole, and the first bypass air passage are arranged so as to be open while facing to the first communication groove having the larger groove width than the hole diameter and the passage diameter thereof, and the second air control hole and the second bypass air passage are arranged so as to be open while facing to the second communication groove having the larger groove width than the hole diameter and the passage diameter thereof.

In accordance with the structure mentioned above, in the first and second air control holes, it is possible to easily change the hole diameter and the opening position in the longitudinal direction of the valve body slidable hole within the range of the groove width of the communication groove, and it is possible to easily adjust control of the idle air amount and setting of the supply start timing with respect to the movement of the plunger valve.

Further, in the first and the second bypass air passages, it is possible to change the opening positions with respect to the one side wall surface and the other side wall surface of the throttle body within the range of the groove width of the communication groove, whereby it is possible to improve an adaptability of the control apparatus main body with respect to many kinds of throttle bodies.

DETAILED DESCRIPTION OF PREFERRED EMBODIMENT

A description will be given below of an embodiment of an idle air control apparatus in a multiple throttle body in accordance with the present invention with reference to the accompanying drawings.

An idle air control apparatus S is formed as follows.

Figure 1:
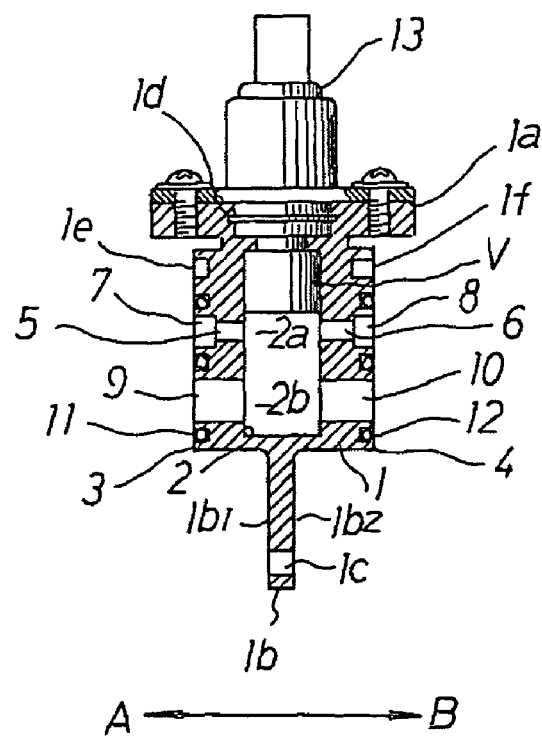
FIG. 1 is a vertical cross sectional view of a main portion showing an embodiment of an idle air control apparatus in accordance with the present invention.
Figure 2:
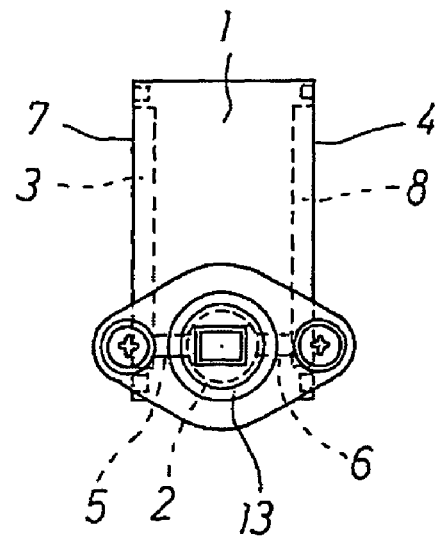
FIG. 2 is a plan view of an upper portion in FIG. 1.
Figure 3:
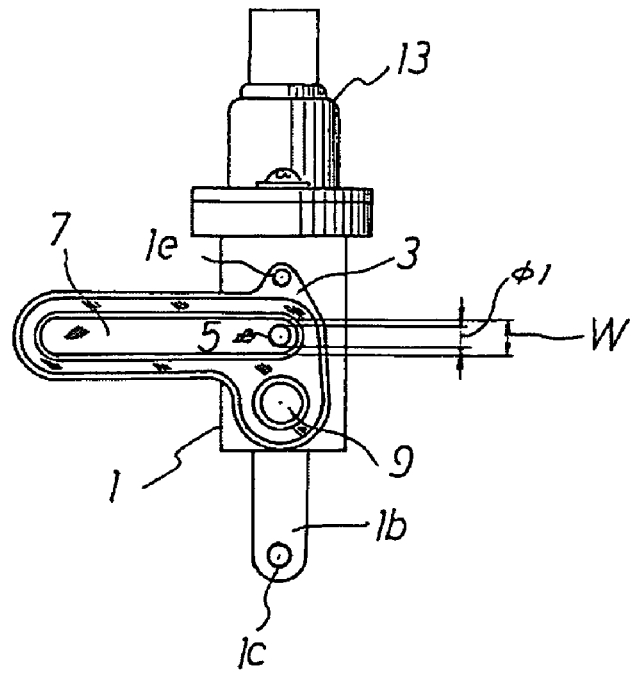
FIG. 3 is a left side view of the idle air control apparatus in FIG. 1.
Figure 4:
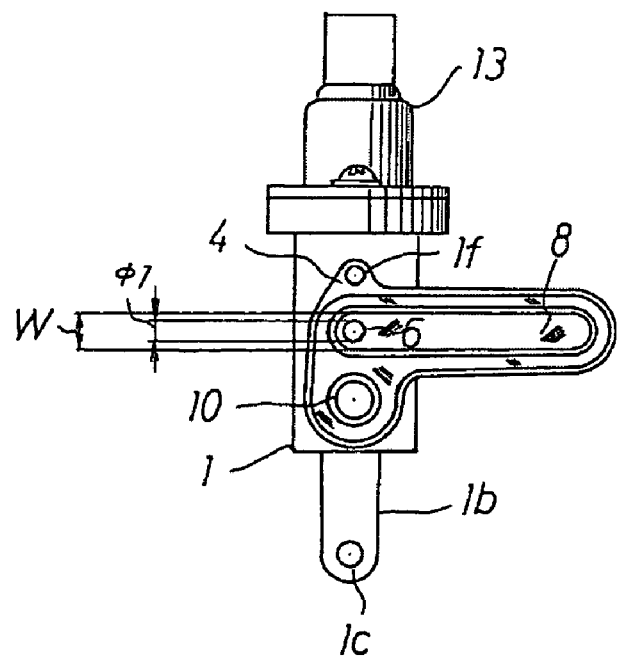
FIG. 4 is a right side view of the idle air control apparatus in FIG. 1.

A description will be given with reference to FIGS. 1 to 4. FIG. 1 is a vertical cross sectional view of a main portion of an idle air control apparatus. FIG. 2 is a plan view of an upper portion in FIG. 1. FIG. 3 is a left side view in FIG. 1. FIG. 4 is a right side view in FIG. 1.

In this case, in the following description, another side A indicates a left side in the drawing, and one side B indicates a right side in the drawing, for easy understanding.

Reference numeral 1 denotes a control apparatus main body. The control apparatus main body 1 is continuously provided with a valve body driving mechanism insertion hole 1d and a valve body slidable hole 2 from an upper end 1a toward a lower side.

Another side mounting wall surface 3 having a flat shape is formed in another side A of the control apparatus main body 1, and one side mounting wall surface 4 having a flat shape is formed in one side B.

Further, a first air control hole 5 is provided toward the other side mounting wall surface 3 and a second air control hole 6 is provided toward the one side mounting wall surface 4, in an upper side wall 2a of the valve body slidable hole 2.

In this case, the first air control hole 5 is provided in a concave manner on the other side mounting wall surface 3, and is open to a bottom portion of a first communication groove 7 formed toward a desired direction.

Further, the second air control hole 6 is provided in a concave manner on the one side mounting wall surface 4, and is open to a bottom portion of a second communication groove 8 formed toward a desired direction.

In the present embodiment, the first and second communication grooves 7 and 8 are provided in a concave manner in a direction orthogonal to a longitudinal axis of the valve body slidable hole 2. (In this case, the position at which the first and second communication grooves 7 and 8 are provided in the concave manner are not limited to the positions mentioned above.)

Further, it is preferable that a groove width W of the first and second communication grooves 7 and 8 is larger than a hole diameter (φ1) of the first and second air control holes 5 and 6.

Further, a first air hole 9 is provided toward the other side mounting wall surface 3 and a second air hole 10 is provided toward the one side mounting wall surface 4, in a lower side wall 2b of the valve body slidable hole 2.

Summarizing the above, in the valve body slidable hole 2, the first and second air control holes 7 and 8 are open to the upper side wall 2a, and the first and second air holes 9 and 10 are open to the lower side wall 2b. Further, the first air control hole 5 is open to the other side mounting wall surface 3 via the first communication groove 7, and the first air hole 9 is open thereto. The second air control hole 6 is open to the one side mounting wall 4 via the second communication groove 8 and the second air hole 10 is open thereto.

Further, in the other side mounting wall surface 3, there is arranged a first seal member 11 such as an O-ring, a square ring or the like shutting off communication with the first communication groove 7 including the first air hole 9 and the first air control hole 5, and in the one side mounting wall surface 4, there is arranged a second seal member 12 such as an O-ring, a square ring or the like shutting off communication with a second communication groove 8 including the second air hole 10 and the second air control hole 6.

In FIGS. 3 and 4, the first and second seal members 11 and 12 are omitted.

In this case, reference symbol 1b denotes a mounting collar portion formed so as to protrude toward a lower side from a bottom portion of the control apparatus main body 1. A mounting hole 1c is provided through in a side portion of the mounting collar portion 1b. Further, reference symbol 1e denotes a first positioning hole provided in the other side mounting wall surface 3, and reference symbol 1f denotes a second positioning hole provided in the one side mounting wall surface 4.

Further, a valve body driving mechanism 13 constituted by a stepping motor, a wax body or the like is inserted into the valve body driving mechanism insertion hole 1d from the upper end 1a of the control apparatus main body 1 so as to be fixedly arranged, and is integrally attached to the valve body driving mechanism 13, and a plunger valve V actuated by a valve body driving mechanism is movably arranged within the valve body slidable hole 2, whereby an idle air control apparatus S is formed.

Next, a description will be given of a main portion of a first throttle body and a second throttle body constituting the multiple throttle body.

Figure 5:
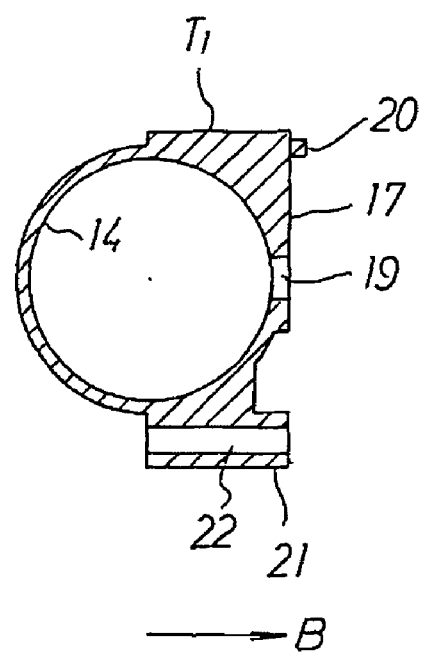
FIG. 5 is a vertical cross sectional view of a first throttle body constituting a multiple throttle body (a vertical cross sectional view along a line C-C in FIG. 6)
Figure 6:
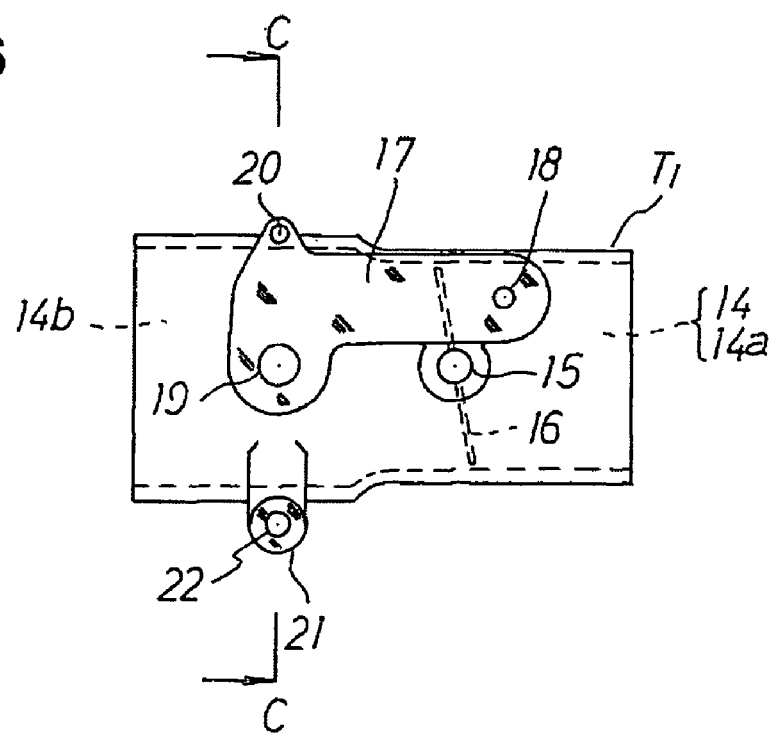
FIG. 6 is a right side view of FIG. 5.

FIG. 5 is a vertical cross sectional view (corresponding to a vertical cross sectional view along a line C-C in FIG. 6) of a first throttle body T1. FIG. 6 is a right side view of the first throttle body T1.

The first throttle body T1 is provided in such a manner that a first intake passage 14 passes through an inner portion, and the intake passage is opened and closed by a first throttle valve 16 attached to a first throttle valve shaft 15 crossing the first intake passage 14.

Further, one side wall surface 17 having a flat shape is formed at the one side B of the first throttle body T1, and it is preferable that the one side wall surface 17 is formed in the same shape as the shape of the other side mounting wall surface 3 of the control apparatus main body 1.

Further, a first bypass air passage 18 and a first air introduction path 19 are provided in the one side wall surface 17. The first bypass air passage 18 extends toward an intake passage 14a at a downstream side of the first throttle valve 16, and the first air introduction path 19 extends toward an intake passage 14b at an upstream side of the first throttle valve 16.

Further, a first positioning pin 20 is provided in a protruding manner in the one side wall surface 17.

In this case, reference numeral 21 denotes a first mounting boss formed so as to protrude toward the one side B. A first mounting hole 22 is provided through in an inner portion of the first mounting boss 21.

Figure 7:
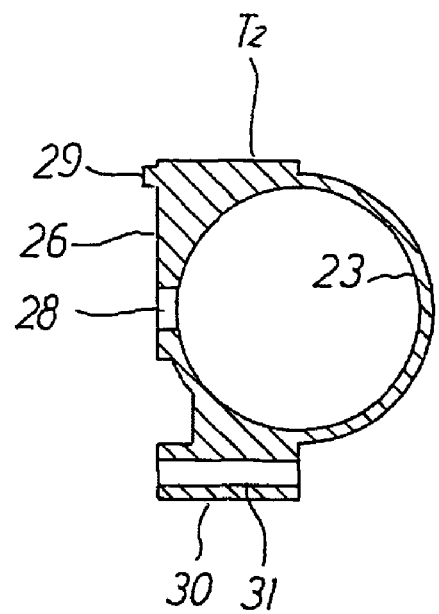
FIG. 7 is a vertical cross sectional view of a second throttle body constituting the multiple throttle body (a vertical cross sectional view along a line D-D in FIG. 8)
Figure 8:
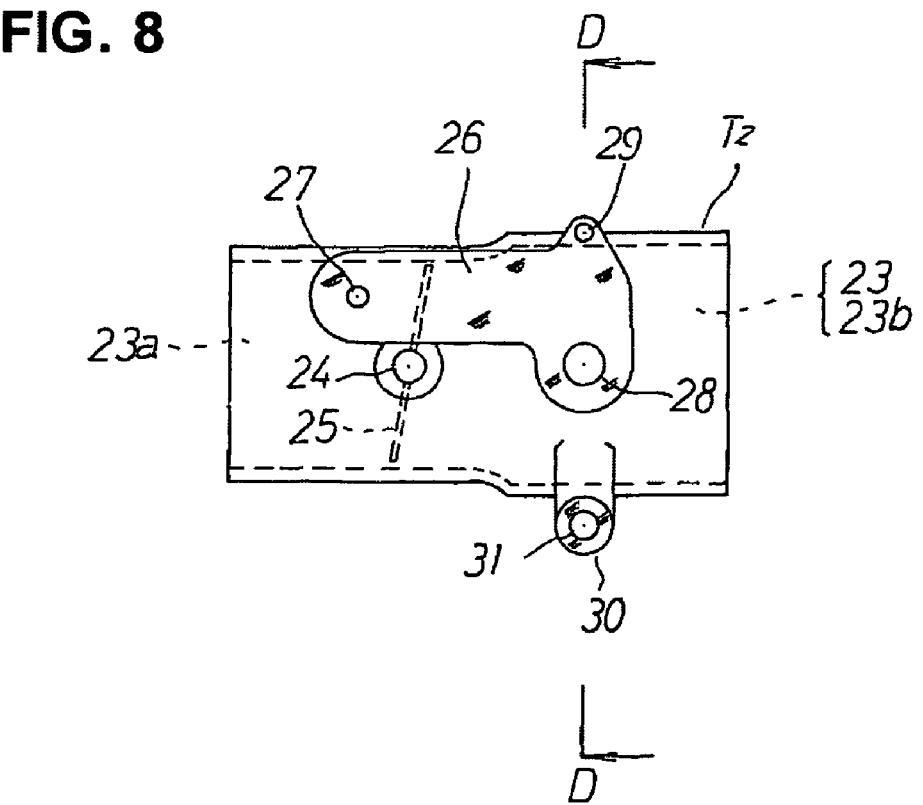
FIG. 8 is a left side view of FIG. 7.
Figure 9:
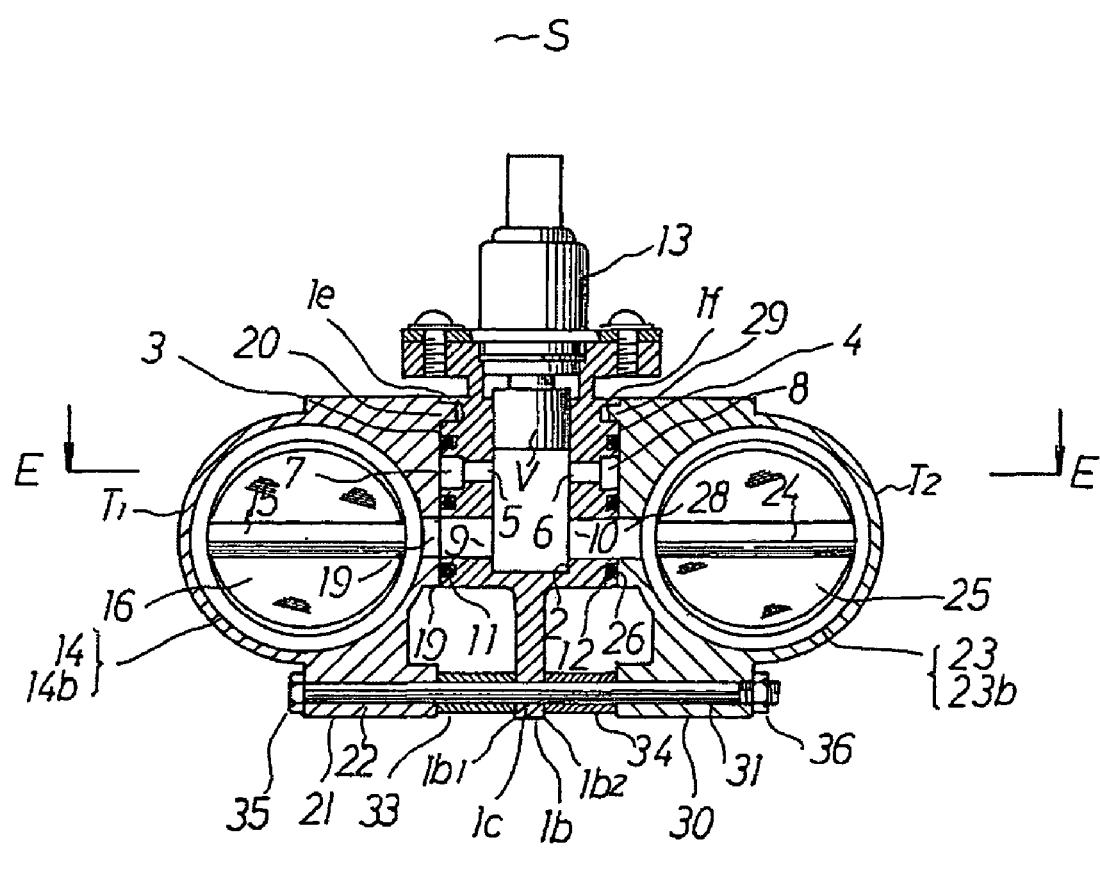
FIG. 9 is a vertical cross sectional view of an idle air control apparatus in a multiple throttle body in accordance with the present invention.
Figure 10:
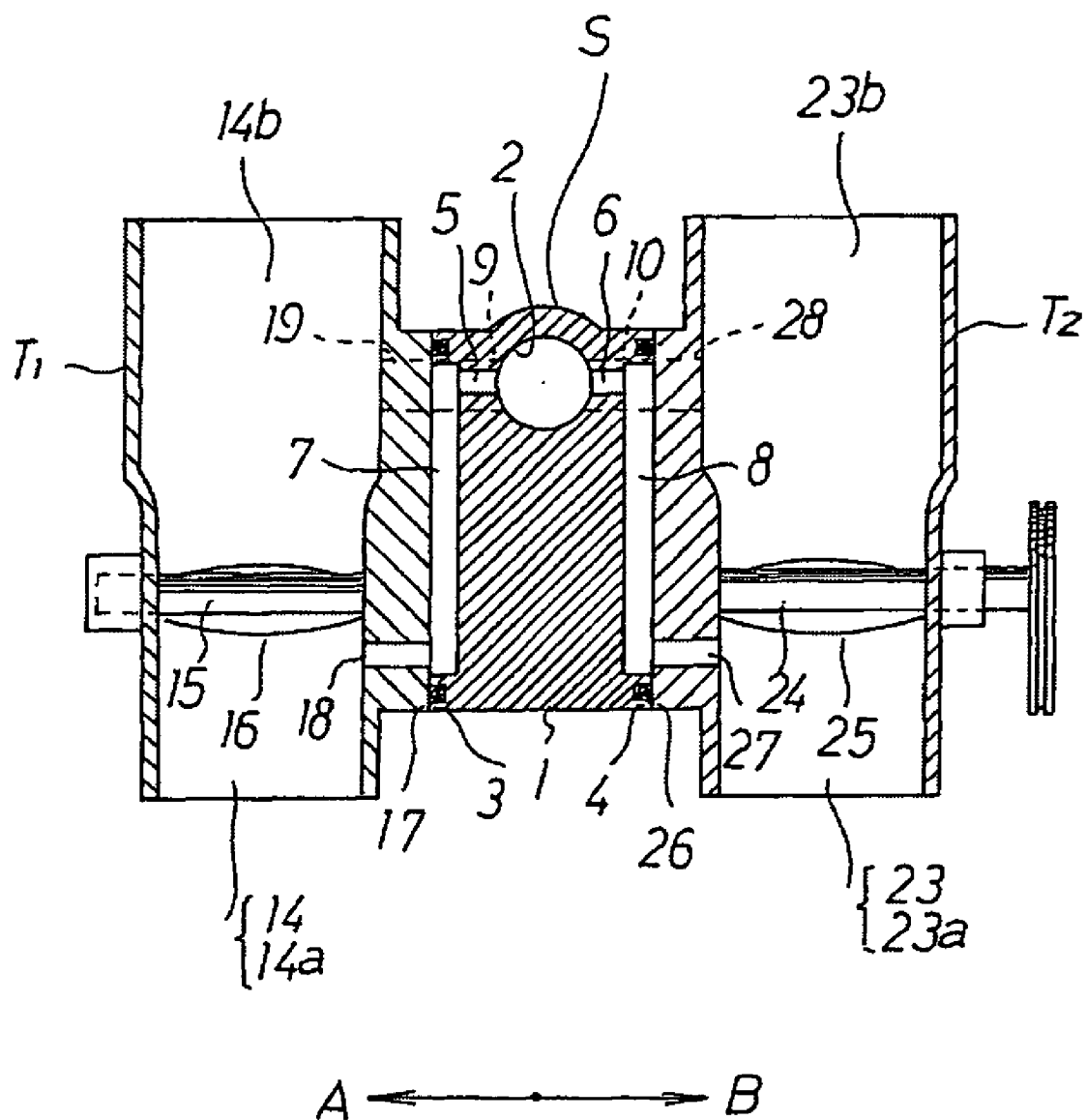
FIG. 10 is a horizontal cross sectional view along a line E-E in FIG. 9.

FIG. 7 is a vertical cross sectional view (corresponding to a vertical cross sectional view along a line D-D in FIG. 8) of a second throttle body T2. FIG. 8 is a left side view of the second throttle body T2.

The second throttle body T2 is provided in such a manner that a second intake passage 23 passes through an inner portion, and the intake passage is opened and closed by a second throttle valve 25 attached to a second throttle valve shaft 24 crossing the second intake passage 23.

Further, another side wall surface 26 having a flat shape is formed at the other side A of the second throttle body T2, and it is preferable that the other side wall surface 26 is formed in the same shape as the shape of the one side mounting wall surface 4 of the control apparatus main body 1.

Further, a second bypass air passage 27 and a second air introduction path 28 are provided in the other side wall surface 26. The second bypass air passage 27 extends toward an intake passage 23a at a downstream side of the second throttle valve 25, and the second air introduction path 28 extends toward an intake passage 23b at an upstream side of the second throttle valve 25.

Further, a second positioning pin 29 is provided in a protruding manner in the other side wall surface 26.

In this case, reference numeral 30 denotes a second mounting boss formed so as to protrude toward the other side A. A second mounting hole 31 is provided through in an inner portion of the second mounting boss 30.

The idle air control apparatus in the multiple throttle body is formed as follows on the basis of each of the structures mentioned above.

The one side wall surface 17 of the first throttle body T1 and the other side wall surface 26 of the second throttle body T2 are arranged so as to face to each other, the control apparatus main body 1 of the idle air control apparatus S is arranged between the facing wall surfaces 17 and 26, and the control apparatus main body 1 is fixedly arranged between the facing wall surfaces 17 and 26 of both the throttle bodies T1 and T2, under the state mentioned above.

In other words, the first positioning pin 20 is inserted to the first positioning hole 1e while the other side mounting wall surface 3 of the control apparatus main body 1 is arranged so as to be brought into contact with the one side wall 17 of the first throttle body T1. On the other hand, the second positioning pin 29 is inserted to the second positioning hole 1f while the one side mounting wall surface 4 of the control apparatus main body 1 is arranged so as to be brought into contact with the other side wall 26 of the second throttle body T2.

On the other hand, the first mounting boss 21 of the first throttle body T1 is arranged so as to be brought into contact with another side surface 1b1 of the mounting collar portion 1b of the control apparatus main body 1 via a first collar 33, a second mounting boss 30 of the second throttle body T2 is arranged so as to be brought into contact with one side surface 1b2 of the mounting collar portion 1b via a second collar 34, a bolt 35 is arranged so as to be inserted to the first mounting hole 22 of the first mounting boss 21, the first collar 33, the mounting hole 1c, the second collar 34 and the second mounting hole 31 of the second mounting boss 30, under the state mentioned above, and an end portion of the bolt 35 is screwed by a nut 36. Accordingly, the control apparatus main body 1 is fixed by screwing between the first throttle body T1 and the second throttle body T2.

In accordance with the structure mentioned above, the first air hole 9 open to the other side mounting wall surface 3 of the control apparatus main body 1 is connected to the first air introduction path 19 open to the one side wall surface 17 of the first throttle body T1, and the first bypass air passage 18 open to the one side wall surface 17 of the first throttle body T1 is connected to the first communication groove 7 open to the other side mounting wall surface 3 and connected to the first air control hole 5.

In this case, the communication between the first communication groove 7 and the first air hole 9 is shut off by the first seal member 11. Further, the second air hole 10 open to the one side mounting wall surface 4 of the control apparatus main body 1 is connected to the second air introduction path 28 open to the other side wall surface 26 of the second throttle body T2, and the second bypass air passage 27 open to the other side wall surface 26 of the second throttle body T2 is connected to the second communication groove 8 open to the one side mounting wall surface 4 and connected to the second air control hole 6.

The communication between the second communication groove 8 and the second air hole 10 is shut off by the second seal member 12.

In accordance with the idle air control apparatus in the multiple throttle body structured as mentioned above, the air within the intake passage 14b at the upstream side of the first throttle valve 16 is supplied to the lower side of the valve body slidable hole 2 via the first air introduction path 17 and the first air hole 9, and the air within the intake passage 23b at the upstream side of the second throttle valve 25 is supplied to the lower side of the valve body slidable hole 2 via the second air introduction path 28 and the second air hole 10.

In this case, the plunger valve V is actuated by the valve body driving mechanism 13, and the openings of the first and second air control holes 5 and 6 open to the valve body slidable hole 2 are controlled. In accordance with this structure, the idle air controlled by the first air control hole 5 is supplied into the intake passage 14a at the downstream side of the first throttle valve 16 via the first communication groove 7 and the first bypass air passage 18. On the other hand, the idle air controlled by the second air control hole 6 is supplied into the intake passage 23a at the downstream side of the second throttle valve 25 via the second communication groove 8 and the second bypass air passage 27. Accordingly, optimum idle air is supplied toward an engine.

In accordance with the idle air control apparatus structured as mentioned above, since the idle air control apparatus S is arranged so as to be held between the one side wall surface 17 of the first throttle body T1 and the other side wall surface 26 of the second throttle body T2 which are adjacently provided, it is possible to effectively use the space between the facing surfaces of the throttle bodies T1 and T2 and it is possible to arrange the multiple throttle body including the idle air control apparatus in a compact manner. Accordingly, since the outer peripheral portion of the idle air control apparatus S is almost surrounded by the throttle bodies T1 and T2, it is possible to arrange the outer appearance neatly. Further, since all the pipe connecting the passages and the holes are not necessary, the structure is preferably used in the two-wheeled vehicle in which the throttle body is arranged so as to be exposed to the ambient air and the accommodating space is limited.

Further, it is possible to easily execute the maintenance work of the passages and the holes forming the idle air control apparatus, by detaching the idle air control apparatus from the adjacently provided throttle body, and it is possible to largely improve a maintenance property thereof.

Further, the present idle air control apparatus S can be employed commonly for many kinds of multiple throttle bodies such as the throttle bodies having different equipments, by aligning of the opening positions of the first and second bypass air passages 18 and 27 and the opening positions of the first and second air introduction paths 19 and 28 which are open to the respective wall surfaces 17 and 26 of the throttle bodies T1 and T2. Accordingly, it is possible to achieve a reduction of a manufacturing cost.

Further, the first bypass air passage 18 and the first air introduction path 19 are open to the one side wall surface 17 of the first throttle body T1. The second bypass air passage 27 and the second air introduction path 28 are open to the other side wall surface 26 of the second throttle body T2. The second communication groove 8 including the second air control hole 6, and the second air hole 10 are provided in the one side mounting wall surface 4, as well as the first communication groove 7 including the first air control hole 5, and the first air hole 9 are provided in the other side mounting wall surface 3 of the control apparatus main body 1. Accordingly, it is possible to form the distance of the grooves, the passages and the holes particularly short, whereby it is easy to layout the passages, it is possible to largely improve freedom of designing the passages, and it is possible to work the passages in an extremely easy manner and in a short time.

Further, when forming the grooves, holes and passages mentioned above in accordance with casting, since they are formed in linear shapes, it is possible to easily cast them.

Further, since the grooves, holes and passages mentioned above do not require the closure using a plug, it is effective for reducing the manufacturing cost. Further, since the grooves, holes and passages are not arranged in blind hole shapes but in open shapes in a state that the idle air control apparatus S is detached from the throttle bodies T1 and T2, it is possible to securely execute the maintenance of them.

Further, the first seal member 11 is arranged between the first air hole 9 open to the other side mounting wall surface 3 of the control apparatus main body 1, and the opening of the first communication groove 7 to which the first air control hole 5 is connected. Further, the second seal member 12 is arranged between the second air hole 10 open to the one side mounting wall surface 4, and the opening of the second communication groove 8 to which the second air control hole 6 is connected. In accordance with this structure, it is possible to accurately supply the idle air controlled by the first and second air control holes 5 and 6 to the first and second bypass air passages 18 and 27 via the first and second communication grooves 7 and 8.

In this case, the first and second seal members may be arranged in the one side wall surface 17 of the first throttle body T1 and the other side wall surface 26 of the second throttle body T2.

Further, since the hole diameter (φ1) of the first and second air control holes 5 and 6 is formed smaller than the groove width W of the first and second communication grooves 7 and 8, it is possible to change the hole diameters and the hole positions of the first and second air control holes 5 and 6 within the range of the groove width W of the first and second communication grooves 7 and 8, whereby it is possible to freely change a supply characteristic of the idle air and a supply starting point of the idle air.

Further, if the hole diameters of the first and second bypass air passages 18 and 27 are made smaller than the groove width W of the first and second communication grooves 7 and 8, it is possible to change the opening positions of the first and second bypass air passages 18 and 27 with respect to the one side wall surface 17 and the other side wall surface 26 within the range of the groove width W, whereby it is possible to improve an adaptability to many kinds of throttle bodies.

In this case, the first and second air holes 9 and 10 introducing the air to the lower side of the valve body slidable hole 2 and the first and second air introduction paths 19 and 28 communicating therewith may be constituted by only one.

Further, the fixing means of the idle air control apparatus S to the throttle bodies T1 and T2 is not limited to the embodiment.

What is claimed is:

1. An idle air control apparatus in a multiple throttle body comprising:

a first throttle body provided with a first intake passage so as to pass through an inner portion thereof, and structured such that said first intake passage is opened and closed by a first throttle valve;

a second throttle body provided with a second intake passage so as to pass through an inner portion thereof, and structured such that said second intake passage is opened and closed by a second throttle valve;

said first throttle body and said second throttle body being arranged in adjacent to each other; and idle air controlled by a single plunger valve actuated by a valve body driving mechanism being supplied to a downstream side intake passage from a first throttle valve via a first bypass air passage and supplied to a downstream side intake passage from a second throttle valve via a second bypass air passage, wherein the idle air control apparatus is provided with a first air control hole and a second air control hole which are open to an upper side wall of a valve body slidable hole provided in a control apparatus main body, and is provided with a first air hole and a second air hole which are open to a lower side wall, and said first air control hole and the second air control hole are arranged movably within the valve body slidable hole, and are controlled so as to be opened and closed by the plunger valve actuated by the valve body driving mechanism, wherein said idle air control apparatus is fixedly arranged so as to be held between one side wall surface forming a facing surface to the first throttle body, and another side wall surface forming a facing surface to the second throttle body, the one side wall surface and the other side wall surface being adjacent to each other, wherein the first bypass air passage communicating with the intake passage at the downstream side of the first throttle valve is connected with the first air control hole via the one side wall surface of the first throttle body, and the second bypass air passage communicating with the intake passage at the downstream side of the second throttle valve is connected with the second air control hole via the other side wall surface of the second throttle body, and wherein a first air introduction path communicating with the intake passage at the upstream side of the first throttle valve is connected with the first air hole via the one side wall surface of the first throttle body, and a second air introduction path communicating with the intake passage at the upstream side of the second throttle valve is connected with the second air hole via the other side wall surface of the second throttle body.

2. An idle air control apparatus in a multiple throttle body as claimed in claim 1, wherein another side mounting wall surface and one side mounting wall surface are formed in said control apparatus main body, the other side mounting wall surface being arranged at another side of the valve body slidable hole and formed in a flat shape, and the one side mounting wall surface being arranged at one side of the valve body slidable hole and formed in a flat shape, wherein said first air control hole is open to a first communication groove provided in a concave manner in the other side mounting wall surface, and the first air hole is arranged so as to be open to the other side mounting wall surface, wherein the second air control hole is open to a second communication groove provided in a concave manner in the one side mounting wall surface, and the second air hole is arranged so as to be open to the one side mounting wall surface, wherein the first air introduction path open to the one side wall surface of the first throttle body is connected with the first air hole open to said other side mounting wall surface, and the first bypass air passage is connected with the first air control hole via the first communication groove open to said other side mounting wall surface, and wherein the second air introduction path open to the other side wall surface of the second throttle body is connected with the second air hole open to said one side mounting wall surface, and the second bypass air passage is connected with the second air control hole via the second communication groove open to said one side mounting wall surface.

3. An idle air control apparatus in a multiple throttle body as claimed in claim 2, wherein a first seal member and a second seal member are arranged in the other side mounting wall surface of said control apparatus main body and the one side mounting wall surface thereof, respectively, the first seal member shutting off communication between the opening of the first communication groove including the first air control hole and the opening of the first air hole, and the second seal member shutting off communication between the opening of the second communication groove including the second air control hole and the opening of the second air hole.

4. An idle air control apparatus in a multiple throttle body as claimed in claim 2, wherein a groove width of said first communication groove and said second communication groove is made larger than a hole diameter of the first air control hole and the second air control hole, and hole diameters of the first bypass air passage and the second bypass air passage.

* * * * *